(12) United States Patent
Hunt

(10) Patent No.: X9563
(45) Date of Patent: Mar. 31, 1836

(54) HOSE, INDIA RUBBER

(76) Inventor: Samuel Hunt

Samuel Hunt of Baltimore Maryland
Letters Patent.

The Schedule referred to in these Letters Patent and making
part of the same containing a description in the words of the said
Samuel Hunt himself of his improvement in the mode
of conveying water across rivers, ponds, bays or else where by
means of leather or India Rubber cloth Hose.

To all whom these presents shall come, Be it known that
I Samuel Hunt of the City and County of Baltimore and
State of Maryland have invented a new and useful improve
ment in the mode of conveying water across rivers, ponds bays
or elsewhere, by means of leather or india Rubber cloth Hose,
and that the following is a full and exact description thereof
that is to say, I form a hose in the usual way of making hose
for fire engines, but with less frequent joints, and of suitable
dimentions and strength to answer the purpose desired, and to
that end when more strength is required than the best quality
of leather will afford, I wrap the leather hose around with can
vass, Ropes, bands of leather, wood, metal, or other substances,
which are to be wound round it in a spiral or other manner in
as many turns or thicknesses as may be deemed proper to secure
sufficient strength for the [illegible] pressure of water required.
The said canvass ropes or other materials which require it are
to be in most cases well saturated or covered with [illegible]
or gum elastic, or other suitable substance, and also the leather
hose, and in some instances for a further security from burst
ing or external injury I enclose the hose in trunks formed of
plank, say from ten to twenty feet in length, more or less clamp
ed together with joist, and the joint confined about it with
[illegible]. each of the lengths are to be connected by fastening pieces
of plank upon the [illegible] sides of one end of each of the trunks
and projecting say eighteen inches beyond the end of the trunk, and then connecting to the end of the next joint, or trunk by means of screws or other pins which shall pass through the outside piece and into the trunk but not quite through it which pins are to be placed opposite to each other, and to serve as pivots, or points to the trunks that they may be raised or lowered with ease, and conform to, or bed themselves in the bottoms of rivers ponds &c. in an undulating manner. where the nature of the beds of rivers &c require it. and to prevent mud from entering in the hose from being jammed. into the joints. at the bottom I fasten a piece of sheet lead or copper to the plank of one of the trunks, allowing it to slide freely under or between the hose and the plank out, or, in; upon the other or adjoining trunk when rivers which have muddy or soft bottoms are to be crossed I will drag a channel or furrow in the bottom of the river and then sink the hose within it so that the current or tide shall have no power of action upon it.

What I claim as my invention or improvement is the application of hose whether constructed in the manner set forth or otherwise not intending to confine myself to any particular dimensions or materials in its construction for the purpose of conveying good and wholesome water for the use of Cities Towns and Villiages &c across Rivers ponds Bays creeks or elsewhere.

Samuel Hunt

Witnesses
James Thompson
Clement T Coote

No drawing necessary (648 Words)